(12) United States Patent
Lin

(10) Patent No.: US 6,919,882 B2
(45) Date of Patent: Jul. 19, 2005

(54) POSITION DETECTION METHOD AND DEVICE

(75) Inventor: Shyuh Der Lin, Hsinchu (TW)

(73) Assignee: Holylite Microelectronics Corp., Hsinchu (TW)

( * ) Notice: Subject to any disclaimer, the term of this patent is extended or adjusted under 35 U.S.C. 154(b) by 342 days.

(21) Appl. No.: 10/335,695

(22) Filed: Jan. 2, 2003

(65) Prior Publication Data

US 2004/0130533 A1 Jul. 8, 2004

(51) Int. Cl.[7] .................................................. G09G 5/00
(52) U.S. Cl. .................. 345/174; 178/18.06; 178/19.03
(58) Field of Search ....................... 345/174; 178/18.06, 178/19.03, 18.02

(56) References Cited

U.S. PATENT DOCUMENTS 5,283,558 A * 2/1994 Chan ........................... 345/168

* cited by examiner

Primary Examiner—Sumati Lefkowitz
Assistant Examiner—Rodney Amadiz
(74) Attorney, Agent, or Firm—Perkins Coie LLP

(57) ABSTRACT

The present invention disclosed a position detection device and method for use in a plane surface to determine the position of a capacitive coupling device. Two arrays of row and column conductive wires form two layers on a substrate, said two layers are isolated by an insulated layer; between each two row wires there is a common row wire; between each two column wires there is a common column wire. Said common row and common column wires are connected to a common row terminal and common column terminal respectively. AC signal is applied to two adjacent wires sequentially to determine point P is between row k and row k+1. Then AC signal is applied to row k only, and then applied to row k+1 only, to determine point P is near row k or row k+1. Finally, apply AC signal to common rows and then to all rows to determine point P is closed to row wire or common wire. Then repeats the above process for the columns. By combining the above processes the position in a two-dimensional space is determined. This method increases the accuracy of detection with less conductive row wires and column wires.

19 Claims, 9 Drawing Sheets

POSITION DETECTION METHOD AND DEVICE

BACKGROUND OF THE INVENTION

1. Field of the Invention

The present invention relates to a device and method for position detection on a plane surface selected by a user and providing the coordinate of the position to show information corresponding to the coordinate. In particular, the present invention relates to a position detection device that is able to detect positions on a plane surface of two dimensional with less conductive wires and more accurate detection results.

2. Description of the Related Art

A variety of technologies exist to determine the position of a stylus place on a surface. One technology is a grid of horizontal and vertical wires which placed below the surface of a flat tablet or over the surface of a display device such as computer monitors and providing position indicating signals which are selected by a stylus as shown in FIG. 1. One layer of wires 101 are separated by a grid pitch according to the resolution needed from Row 0 to Row N. Another layer of wires 102 with the same or different pitch forms Column 0 to Column M. Each wire is connected to a driving conductor, which connected to a wire select multiplexer. AC signal is applied to Row 0, Row 1, to Row N, sequentially. Two devices using this type of technology are described a U.S. Pat. Nos. 5/149,919 and 4/656,332 to Greenias, et al. These devices determine the position by applying a driving signal sequentially to a group of conducting wires will need very small grid pitch and more conductive wires to increase the accuracy; it also need more driving conductor to drive the conducting wire. The mechanical and electrical complexity necessary to make the connection would be prohibitive. Although one of them had made use of grouping technology to the wires, the accuracy is still limited. When the AC signal is applied to Row k, all the other rows are kept at zero potential (i.e. at ground voltage). The AC signal is then detect by a capacitive coupling device such as a stylus. By the time the signal is detected, the position of row of the detecting device is determined. After the position is determined, AC signal is then applied to the Columns and using the same device to detect the signal. The position of column can also be determined.

In another technology as shown in FIG. 2, a conductive material layer 200 having electrical resistivity and three or four space apart contact points 201 electrically interconnected with the layer. When signal is applied to each contact, the selected position is determined by the signal received from the stylus and calculated by a processor. Two devices using this type of technology are described in U.S. Pat. Nos. 5/877,458 and 5/686,705 to David J. Conroy and Mark Flowers. These devices determined the position by measuring the unique position indicating signals and compare to that location information stored in the memory. These devices need only 4 to 5 conducting wire (one for stylus). It needs a very uniform resistive thin film 200 over a substrate for each system, which needs very accurate deposition technique to accomplish the mass production. After deposition, it also requires adjusting the location information or parameter for each system; it still needs a very accurate A/D converter to insure the measured signal is accurately converted to position coordinate.

What is needed is an improved method and system for position detection with less conductive wires and more accurate position information. It also need not use expensive and very accurate method to manufacture the device.

OBJECTS OF THE INVENTION

It is therefore an object of the invention to provide an improved position detection method and device for determining a selected position on a surface.

It is another object of the invention to provide a position detection method and device to use less conducting wires to sense the position.

It is yet another object of the invention to provide a position detection method and device to increase the accuracy of the position information.

It is yet a further object of the invention to provide a position detection method and device, which is reliable and is inexpensive to manufacture.

DISCLOSURE OF THE INVENTION

The present invention teaches a devices structure to increase the accuracy of the position information with less conducting wires to sense the position.

A first aspect of the present invention teaches a position detection device for use on a plane surface to determine the position of a capacitive coupling device, comprising: two arrays of row and column conductive wires are isolated by an insulated layer, said row wires have a pitch of c, between each row wires there is a common row wire separated from the row wire with a distance of c/2; said column wires have a pitch of d, between each column wires there is a common column wire separated from the column wire with a distance of d/2; Said common row wires are connected to a common row terminal; Said common column wires are connected to a common column terminal; a wire selecting decoder and a driver supplies AC signal to said row wires and said column wires, as well as common row and common column wires sequentially; An oscillator generates the require frequency and amplitude of AC signal voltage and supplies said signal voltage to a microprocessor; said microprocessor supplies said sequential signal via a bus to said wire selected decoder and driver; A capacitive coupling device senses the detected signal at a point of said plane surface and transmits said detected signal to an amplifier via a shielding wire; An amplitude detector receives and detects the amplitude of said detected signal from said capacitive coupling device and transmits to a A/D converter; Said A/D converter converts said detected signal amplitude to a digital signal and communicates with said microprocessor.

(a) Another preferred embodiment of the present invention teaches a method for detecting a position on a plane surface having row and column conductive wires and common wires between each two row and column wires selectively connected to a wire selecting decoder and driver, a signal oscillator, a microprocessor, a capacitive coupling device for pick up the detected signal which is put on point P, comprising the steps of: Applying AC signal to common row of one page and then the other page, measure the signal by a capacitive coupling device as v(2) and v(1); Comparing the magnitude of v(2) and v(1) to determine the page in detection; Applying AC signal to row k and row k+1 at the same time, where k=0 to N−1, all other rows and the common rows at zero potential, measure the signal by a capacitive coupling device as $v_k$; Comparing $v_k$ to $v_{k-1}$, if $v_k$ is the maximum, the position is between row k and row k+1; Applying AC signal to row k only, all other rows and common row at zero potential, measure the signal $v_k$, then applying AC signal to row k+1 only, all other rows and common rows at zero potential, measure the signal $v_{k+1}$; compare $v_k$ and $v_{k+1}$, if $v_k$ is greater than $v_{k+1}$, point P is near to row k, if $v_k$ is less than $v_{k+1}$, point P is near to row k+1; Applying AC signal to common rows, all the rows at zero potential, measure the signal $v_1$; applying AC signal to all rows, with the common rows at zero potential, measure the signal $v_2$; Comparing $v_2$ to $v_1$, if $v_2/v_1$ is greater than 1, point P is closed to row k; if $v_2/v_1$ is less than 1, point P is closed to that common row; Finally, repeat the above steps for the column.

Yet another aspect of the present invention teaches a method wherein the space between row k and common row is divided into n divisions, by storing the experiment $v_2/v_1$ ratio corresponding to each space n for different dielectric constant materials and different thickness of material over the conducting wires, the position can be determined by comparing the detecting $v_2/v_1$ ratio to the stored value.

BRIEF DESCRIPTION OF THE DRAWINGS

The foregoing and other advantages of the invention will be more fully, understood with reference to the description of the best embodiment and the drawing wherein.

DESCRIPTION OF THE PREFERRED EMBODIMENTS

Figure 1:
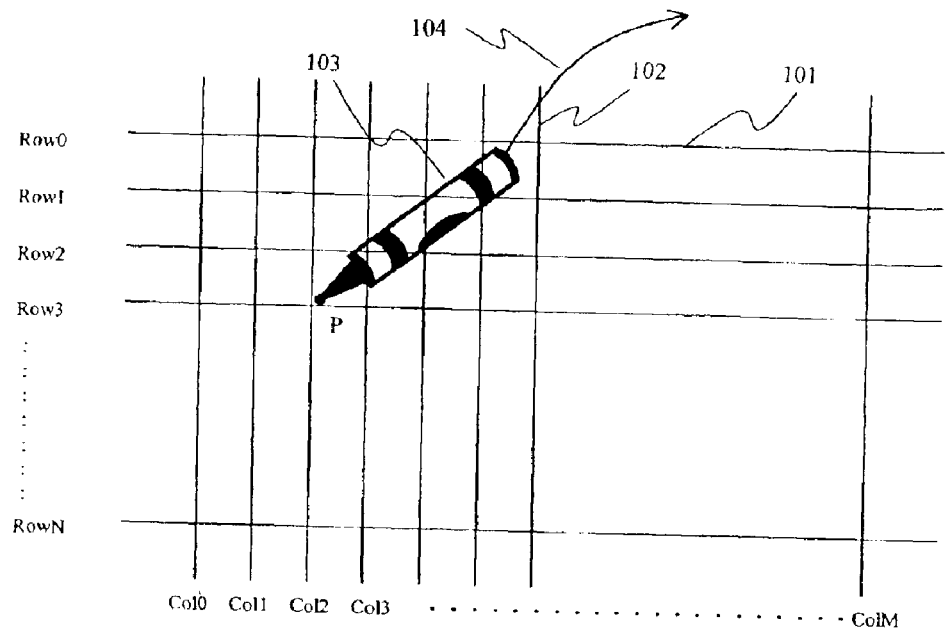
FIG. 1 (prior art) is the layout of conductive wires of row and column in two layers and the stylus in position P.
Figure 2:
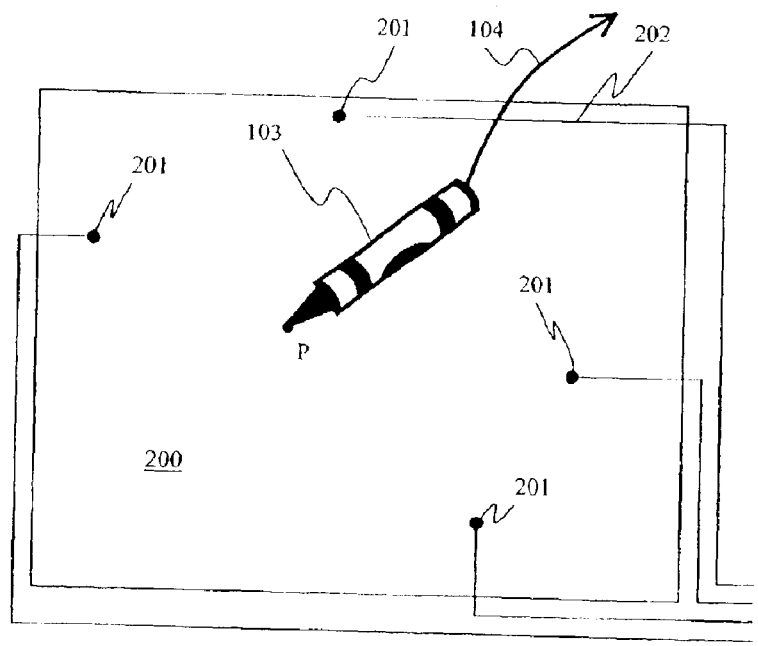
FIG. 2 (prior art) is a conductive material layer 200 with four contact pints 201 and the stylus 103 in position P.
Figure 3:
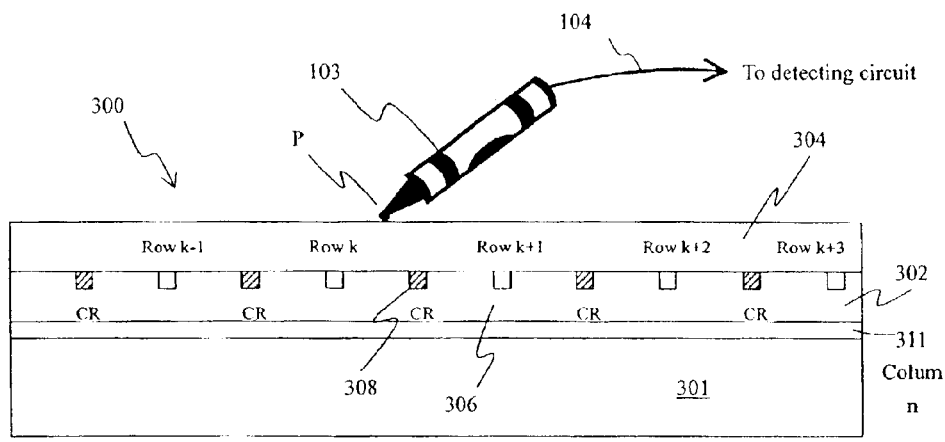
FIG. 3 is a cross sectional view of the conductive wire board and the stylus in according to one embodiment of the present invention.
Figure 4:
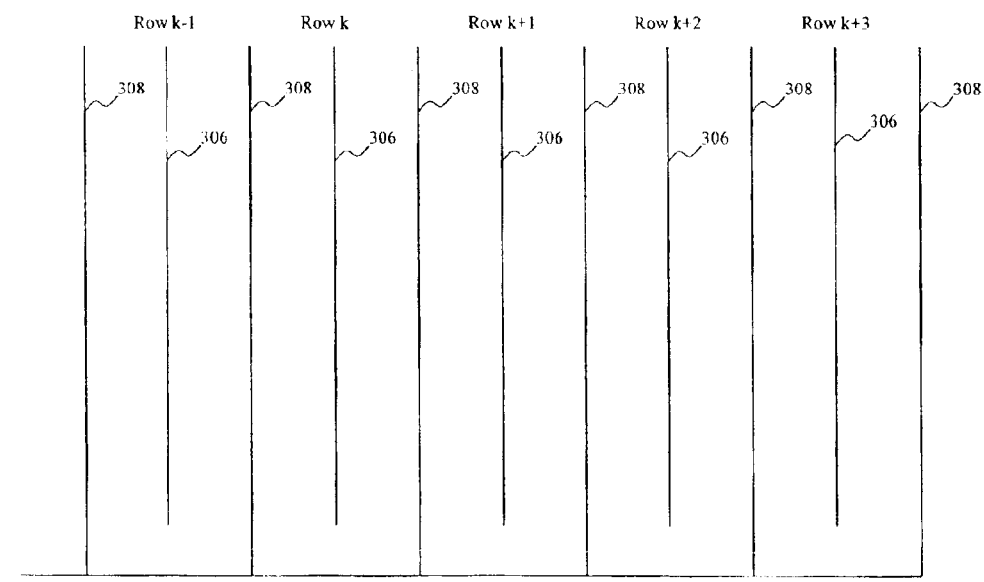
FIG. 4 is the layout of the row conductive wires and the Row common conductive wires according to one embodiment of the present invention.

The cross sectional view of a conductive wire board is shown in FIG. 3 and the layout of the row conductive wires and the common of row wires is shown in FIG. 4 according to one embodiment of the present invention. Referring to FIG. 3, the conductive wire board 300 for position detection is made by screen printing, deposition or plating of conductive layer of the column wire on a substrate 301, the conductive layer such as aluminum or copper is then patterned and etched (for deposition method) to form the column wire from column 0 to column M 311 and the common column wire. After forming an insulating layer 302, another conductive layer is formed on the insulating layer 302 using the same method to form the row wire from row 0 to row N 306, and the common row wire CR 308. Finally a layer of insulating film 304 is formed on the top of the row and common row wires.

Figure 11:
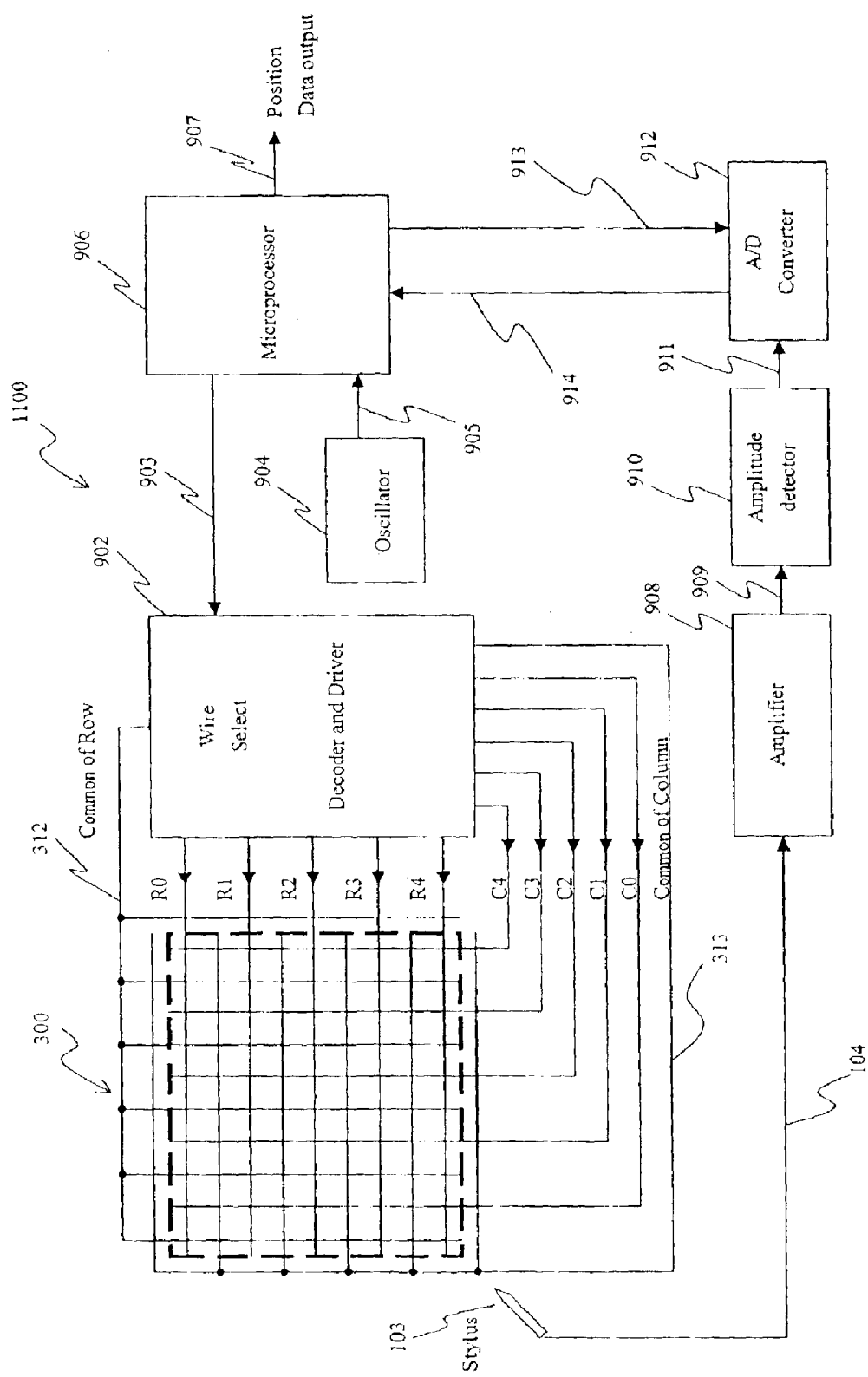
FIG. 11 shows the architectural diagram of the position detection and radio frequency signal driving circuit system.

A point P is detected by a capacitive coupling device 103, which is connected to an amplifier (shown in FIG. 11) by a wire 104 with ground shielding. In one embodiment, the layer position of row wires and column wire may be changed. For example, the row wires may be on the bottom and the column wires on the top. The wires may be connected to a wire selected decoder and driver (as shown in FIG. 11) to supply sequential AC signal to each wire for detection by the capacitive coupling device 103.

FIG. 4 shows the layout of the conductive row wires of Row k-1 to Row k+3 306 and the common row wires 308, the common row wires are inserted into the mid point between each pair of row wires, so the number of row wires can be cut down to a half as it would be for the same accuracy of position detection.

Figure 5:
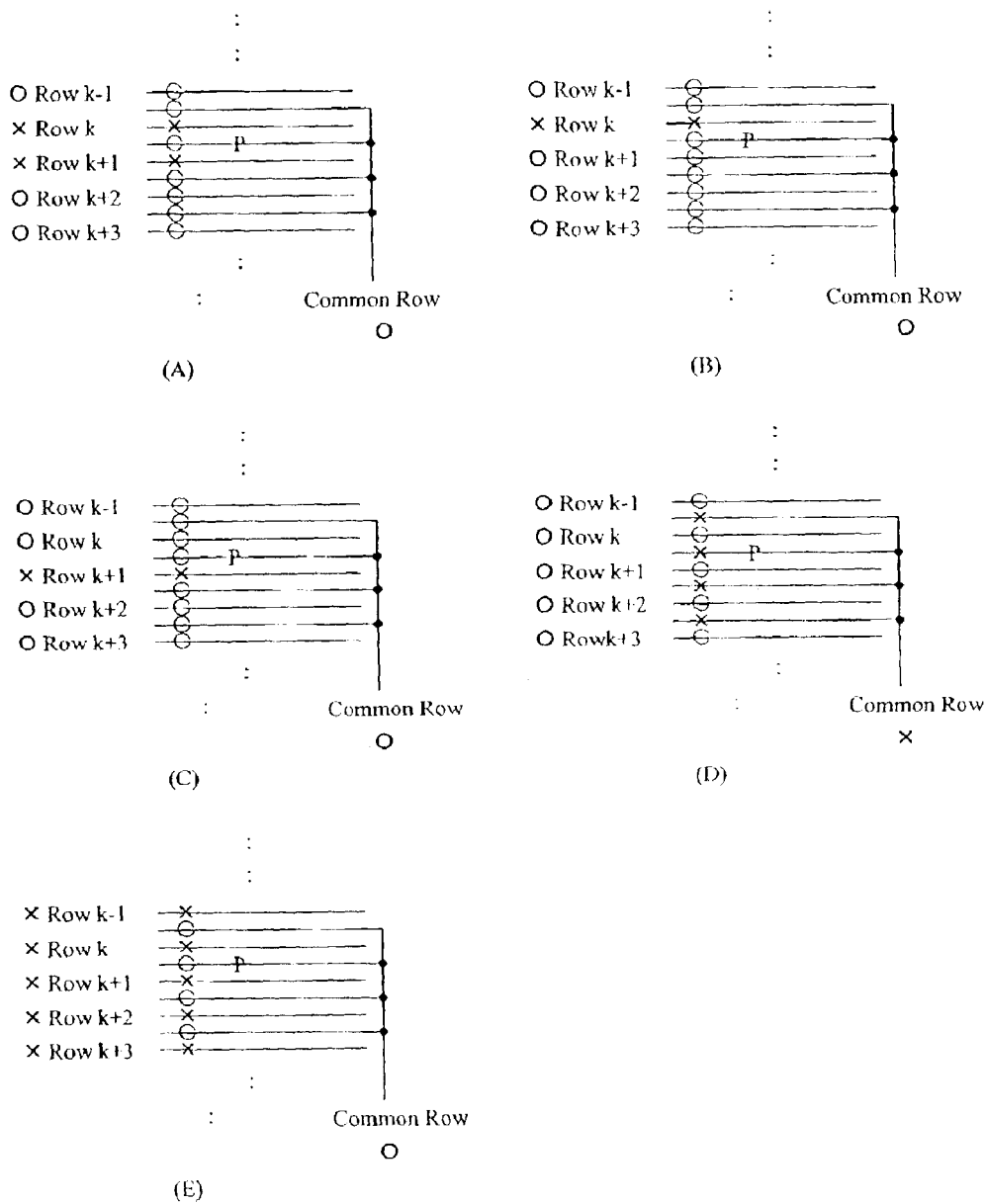
FIG. 5 (A) (B) (C) (D) (E) illustrates the sequence of applying AC signal to the conductive wire of row and common row.

FIG. 5 illustrates the sequence of applying AC signal to the conductive wires of row and common row according to one embodiment of the present invention. In FIG. 5, AC signal is represented by "X", zero potential by "O". As shown in FIG. 5(A), first, the tip of capacitive coupling device is pointed to point P, then apply AC signal at Row 0 and Row 1 at the same time, keep all the other Rows and the Common Rows at zero potential, measure the signal by an AC capacitive coupling device, for example a stylus as $v_1$, then apply AC signal at Row 1 and Row 2, measure the signal as $v_2$ . . . If $v_k$ is the maximum, then the position of the capacitive coupling device is between Row k and Row k+1. Next, refer to FIG. 5(B) and (C), to determine point P is near to Row k or near to Row k+1, apply AC signal to Row k, and keep all the other Rows and Common Rows at zero potential, as shown in FIG. 5(B), measure the signal as $v_k$, then apply AC signal to Row k+1, and keep all the other Rows and Common Rows at zero potential, as shown in FIG. 5(C), measure the signal as $v_{k+1}$, by comparing the magnitude of $v_k$ and $v_{k+1}$, if $v_k$ is greater than $v_{k+1}$, point P is near to Row k, otherwise, point P is near to Row k+1. From this embodiment, the accuracy has double, since we can determine that point P is near Row k or near Row k+1, that is, there are two regions between Row k and Row k+1.

Then suppose that point P is near to Row k, we may continue to determine that point P is near to Common wire or Row k. By applying AC signal to Common Rows and keep all the Rows at zero potential, measure the signal as $v_1$, as shown in FIG. 5(D), then apply AC signal to all Rows and keep the Common Row at zero potential, measure the signal as $v_2$, as shown in FIG. 5(E). If $v_2/v_1>1$, point P is closed to Row k; otherwise, if $v_2/v_1<1$, point P is closed to common Row. From this embodiment, with the common Row inserted between Rows, the accuracy can be increased by a factor of 4. That is, between Row k and Row k+1, there are 4 different positions can be determined.

Figure 6A:
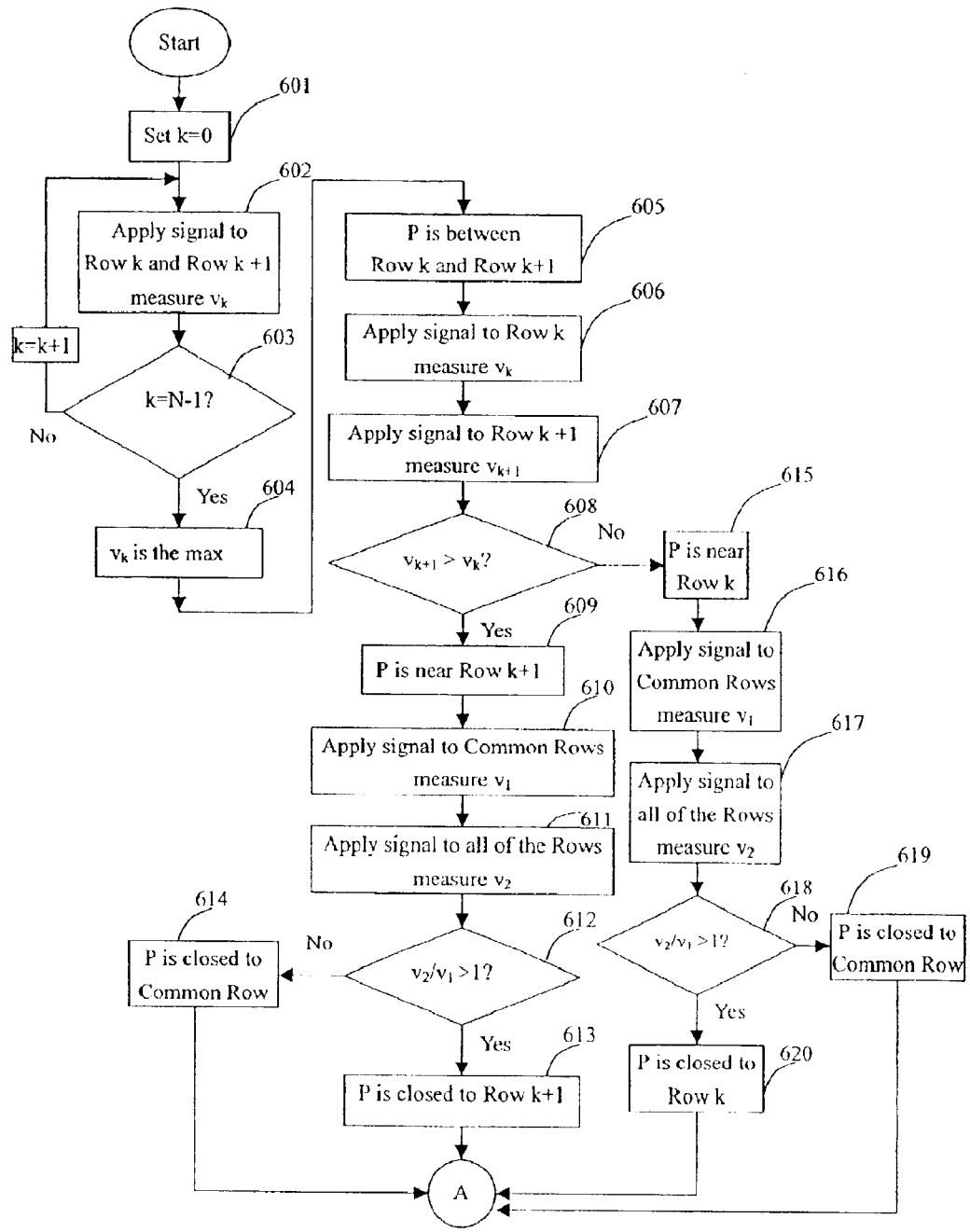
FIG. 6A is a flow diagram of the position detection method on the row according to one embodiment of the present invention.

FIG. 6 is a flow diagram of the position detection method according to one embodiment of the present invention. FIG. 6A shows the procedure for determining the position on the row space. The detection begins when a capacitive coupling device is on point P, in step 601, set k=0, in step 602, AC signal is applied to Row k and Row k+1, the other Rows and the Common Rows are at zero potential, and $v_k$ is measured by the capacitive coupling device. In step 603, determine if k=N−1, if no, set k=k+1 and go back to step 602 until k=N−1, then find the maximum value of $v_k$ at step 604 and come to step 605, now point P is between Row k and Row k+1. In step 606, apply signal to Row k, the other Rows and the Common Rows are at zero potential, measure $v_k$, then in step 607, apply AC signal to Row k+1, the other Rows and Common Rows keep at zero potential, measure $v_{k+1}$, in step 608, determine if $v_{k+1}$, is greater than $v_k$, if yes, P is near to Row k+1. In order to detect point P is near to the common Row or Row k+1, go to step 610, apply AC signal to common Rows, keep all Rows at zero potential, measure signal $v_1$; and in step 611, apply AC signal to all of the Rows and keep the common Rows at zero potential, measure signal $v_2$. Now compare $v_2$ to $v_1$ at step 612, determine $v_2/v_1$ is greater than 1, if yes, P is closed to Row k+1; if not, P is closed to Common Row. Now go back to step 608, if $v_{k+1}$, is smaller than $v_k$, the process go to step 615, P is near Row k. In order to determine point P is near to the Common Row or Row k, go to step 616, apply AC signal to Common Row, keep all Rows at zero potential, measure signal $v_1$; and in step 617, apply AC signal to all of the Rows, keep the Common Rows at zero potential, measure signal $v_2$, then determine whether $v_2/v_1$ is greater than 1, if yes, P is closed to Row k; if not, P is closed to Common Row. The detection is than go to terminal A.

Figure 7:
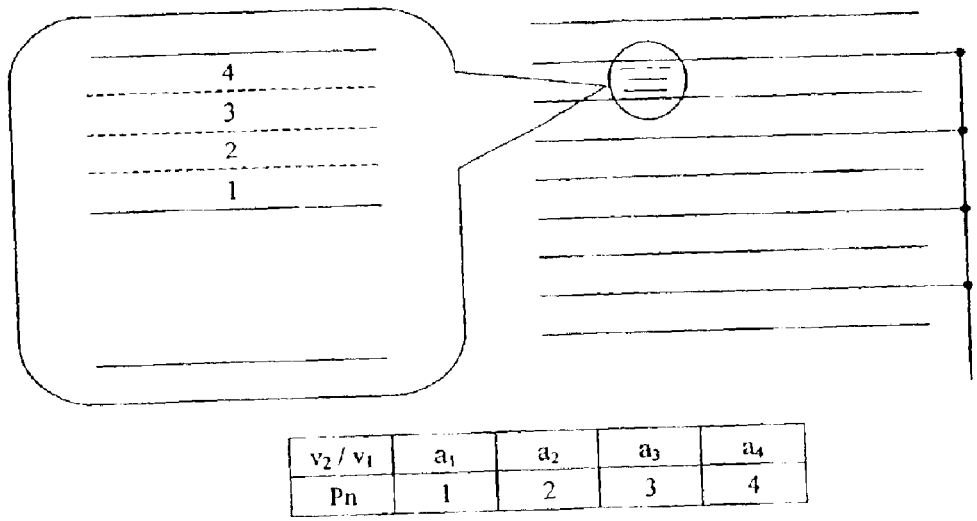
FIG. 7 illustrates more accurate positions between row K and common of row according to one embodiment of the present invention.

It can be further divide the space between Common Row and Row to 3 or 5,6,7 - - - divisions, FIG. 7 illustrates that the space between Common Row and Row is divided into 4 divisions. If the ratio of $v_2/v_1$ is determined corresponding to space 1, space 2, - - -, for different dielectric constant material and different thickness of material over the conducting wires previously, as shown in table 1, and store these ratio in the controller for comparison use, then the measured ratio $v_2/v_1$ may compare to the stored value to determine the position is in which space. For example, if $v_2/v_1 \sim a_2$, then point P is in space 2, etc.

TABLE 1

| $v_2/v_1$ | $a_1$ | $a_2$ | $a_3$ | $a_4$ |
|---|---|---|---|---|
| space | 1 | 2 | 3 | 4 |

Figure 8:
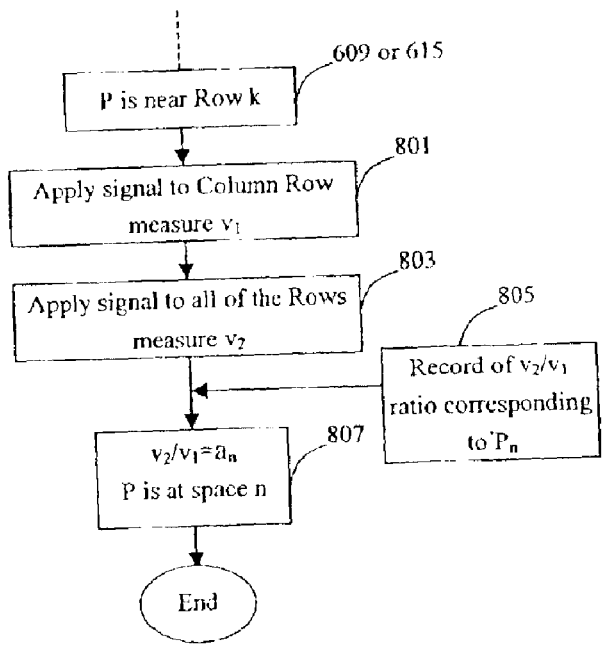
FIG. 8 is a flow diagram for determining the accurate position between two conductive wires.

FIG. 8 is a flow diagram for determining the accurate position between two conductive wires. From FIG. 6 above, the process come to step 609 or 615. P has determine near to Row k, then go to step 801, apply AC signal to Common Rows and keep all Rows at zero potential, measure signal $v_1$; then in step 803, apply AC signal to all of the Rows, keep the common Rows at zero potential, measure signal $v_2$, then using the record of $v_2/v_1$ ratio at step 805, if $v_2/v_1 \sim a_2$, then P is at space 2, etc., then the process come to an end.

Figure 6B:
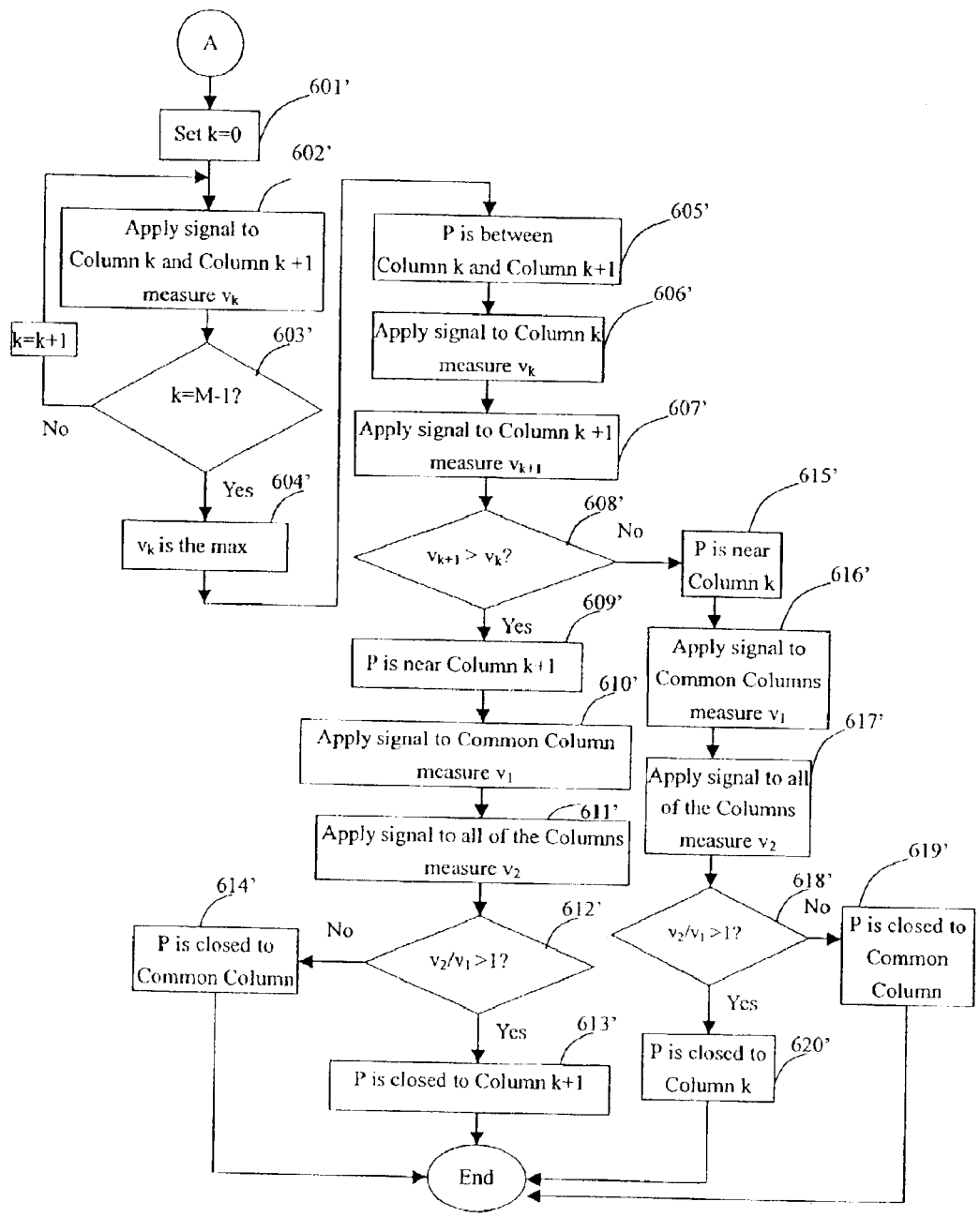
FIG. 6B is a flow diagram of the position detection method on the column according to one embodiment of the present invention.

After determined the position of point P on the Row array, the same procedure can be used to determine the position on the Column array. Refer to FIG. 6B, the detection begin at terminal A, by using the same procedures as on the row space to determine the position of the capacitive coupling device on the column space.

By combining the detected position on the Row array and the Column array, the position on the plane surface of the capacitive coupling device can be determined.

In one embodiment of the present invention, the common rows, common columns, which is not applying AC signal may not be at zero potential, the common rows, common columns, which is not applying AC signal may be at any specific voltage level such as ground potential (zero potential), DC or AC potential; the rows and columns which is not applying AC signal may be at any specific DC voltage.

Figure 9:
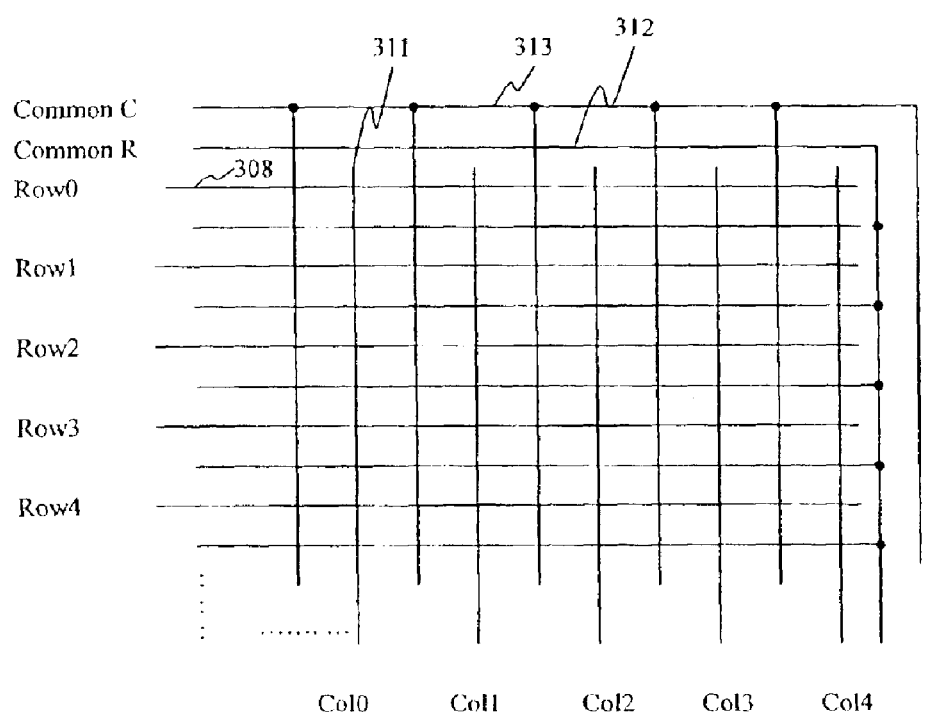
FIG. 9 is a plane view of the layout of the rows, columns, common of rows and common of columns according to one embodiment of the present invention.

FIG. 9 is a plane view of the layout of said rows, columns, Common Rows and Common Columns according to one embodiment of the present invention. The Row array 308 and the Column array 311 are arranged in two layers and the Row array is horizontally and the column array is vertically. Also shown is the Common Row 312 and Common Column 313.

Figure 10:
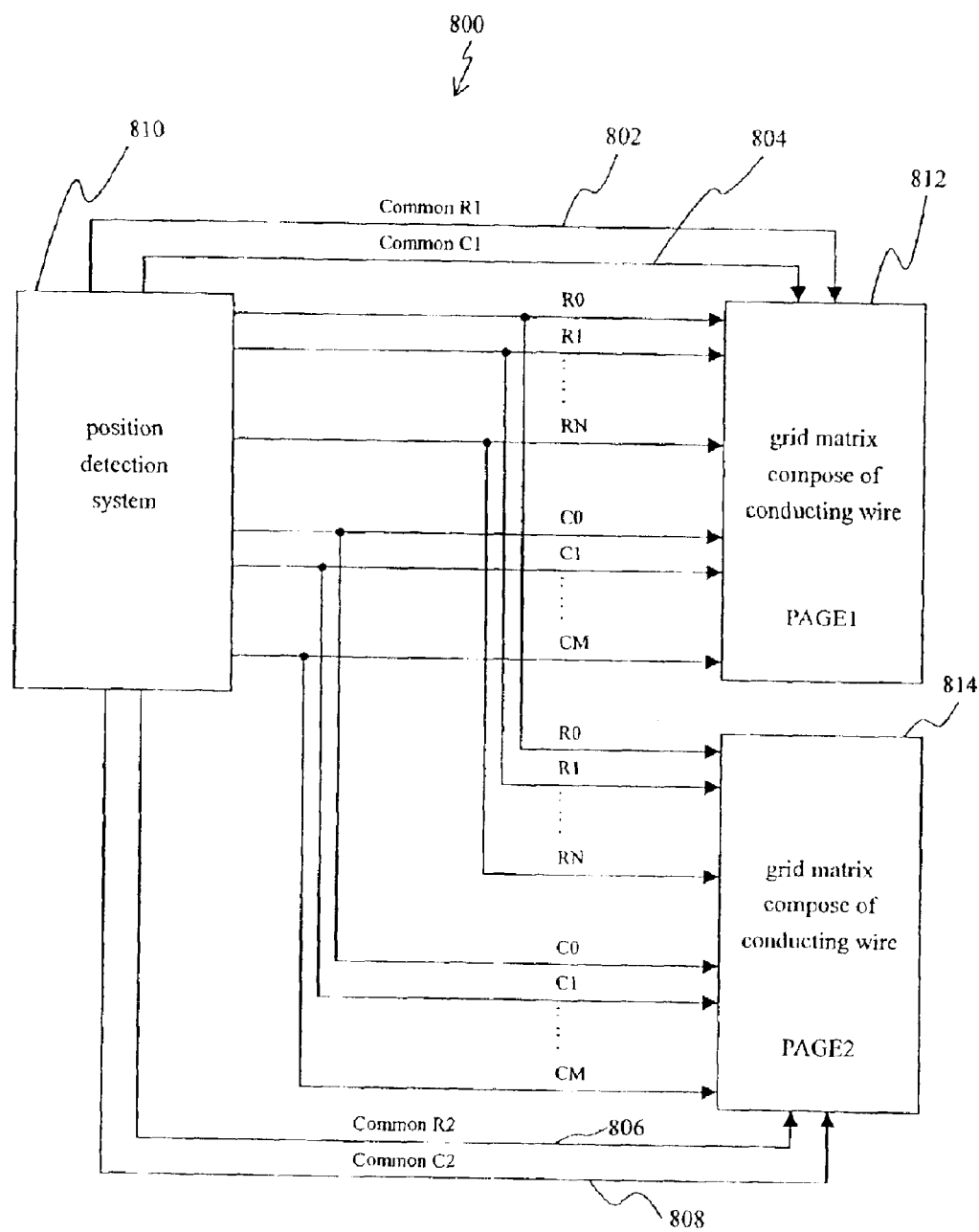
FIG. 10 shows a block diagram of the position detection system 800 for two or more pages.

FIG. 10 shows a block diagram of the position detection system 800 according to one embodiment of the present invention. The grid matrix including different page matrix, in this embodiment, there are page 1 812 and page 2 814, each has their Row array ($R_0$ to $R_N$), Column array ($C_0$ to $C_M$), Common Row (Common $R_1$ and Common $R_2$) and Common Column (Common $C_1$ and Common $C_2$). It is obvious that only two wires (Common $R_2$ and Common $C_2$) are needed for adding one more page. These wires are connected to a position detection system 810 to supply AC signal sequentially and detect the signal sensed by the capacitive coupling device to determine the position of the capacitive coupling device.

In order to determine which page the capacitive coupling device is located, an AC signal is applied to common R2 and common R1 sequentially, then measured the respective signal v(2) and v(1). By comparing the magnitude of the received signal, the page where the capacitive coupling device is located can be determined. In another embodiment of the present invention, the location can also be determined by applying said AC signal to common C1 and common C2 sequentially.

FIG. 11 shows the architectural diagram of the position detection and AC signal driving circuit system according to one embodiment of the present invention. The conductive wire board 300 represent with 5 Rows (R0, R1, R2, R3 and R4) and 5 columns (C0, C1, C2, C3 and C4,), said Rows and Columns are connected to a wire selecting decoder and driver 902, said driver supply AC signal to said Row wire and Column wire as well as said Common of Row and Common of Column sequentially. An oscillator 904 generates the required frequency and amplitude of AC signal voltage and via line 905 to supply said signal voltage to a microprocessor 907, said processor supply the sequential signal via bus 903 to said wire select decoder and driver 902; A capacitive coupling device such as a stylus 103 senses the signal at point P and transmits said signal to an amplifier 908 via a shielding wire 104; the output of said amplifier 908 is fed to an amplitude detector 910, said amplitude detector 910 feed the signal to an AID converter 912 via line 911, said A/D converter 912 communicates with said microprocessor, the detected signals are analyzed by said microprocessor 907, the result is the position Data output 907.

Although specific embodiments of the invention have been disclosed, it will be understood by those having skill in the art that minor changes can be made to the form and details of the specific embodiments disclosed herein, without departing from the spirit and the scope of the invention. The embodiments presented above are for purposes of example only and are not to be taken to limit the scope of the appended claims.

What is claimed is:

1. A position detection device for use on a plane surface to determine the position of a capacitive coupling device, comprising:

two arrays of row and column conductive wires are isolated by an insulated layer, said row wires have a pitch of c, between each row wire there is a common row wire separated from the row wire with a distance of c/2;

said column wires have a pitch of d, between each column wire, there is a common column wire separated from the column wire with a distance of d/2;

said common row wires are connected to a common row terminal;

said common column wires are connected to a common column terminal;

a wire selecting decoder and a driver supplying AC signal to said row wires and said column wires, as well as common row and common column wires sequentially; and supplying a specific voltage level to said common wires, which are not being supplied the AC signal; also supplying specific DC voltage to rows or columns, which are not being supplied the AC signal an oscillator generates the required frequency and amplitude of the AC signal voltage and supplies said signal voltage to a microprocessor;

said microprocessor supplies said sequential signal via a bus to said wire selected decoder and driver;

a capacitive coupling device senses the detected signal at a point of said plane surface and transmits said detected signal to an amplifier via a shielding wire;

an amplitude detector receives and detects the amplitude of said detected signal from said capacitive coupling device and transmits to an A/D converter;

said A/D converter converts said detected signal amplitude to a digital signal and communicates with said microprocessor.

2. The position detection device as recited in claim 1, wherein said position detection device is implemented by rows and common rows only.

3. The position detection device as recited in claim 1, wherein said position detection device is implemented by columns and common columns only.

4. The position detection device as recited in claim 1, wherein said conductive wires are metal.

5. The position detection device as recited in claim 1, wherein said conductive wires are transparent metal oxide.

6. The position detection device as recited in claim 1, wherein said conductive wires are formed by screen printing.

7. The position detection device as recited in claim 1, wherein said conductive wires are formed by deposition.

8. The position detection device as recited in claim 1, wherein said conductive wires are formed by plating.

9. The position detection device as recited in claim 1, wherein said conductive wires are formed on a plastic substrate.

10. The position detection device as recited in claim 1, wherein said conductive wires are formed on a glass substrate.

11. The position detection device as recited in claim 1, wherein said conductive wires are formed on a soft substrate.

12. The position detection device as recited in claim 1, wherein said specific voltage level and specific DC voltage are ground potential.

13. The position detection device as recited in claim 1, wherein said specific voltage level is a DC voltage.

14. The position detection device as recited in claim 1, wherein said specific voltage level is an AC signal.

15. A method for detecting a position on a plane surface having row and column conductive wires and common wires between each two row and column conductive wires selectively connected to a wire selecting decoder and driver, a signal oscillator, a microprocessor, a capacitive coupling device for picking up the detected signal is put on point P, comprising the steps of:

(a) applying AC signal to common row of one page and then the other page, measure the signal by a capacitive coupling device as v(2) and v(1);

(b) comparing the magnitude of v(2) and v(1) to determine the page in detection;

(c) applying AC signal to row k and row k+1 at the same time, where k=0 to N−1, all other rows at a specific DC voltage and the common rows at a specific voltage level potential, measure the signal by a capacitive coupling device as $v_k$;

(d) determining the maximum value of $v_k$, if $v_k$ is the maximum, the position is between row k and row k+1;

(e) applying AC signal to row k only, all other rows at a specific DC voltage and common rows at a specific voltage level potential, measure the signal $v_k$, then applying AC signal to row k+1 only, all other rows at a specific DC voltage and common rows at a specific voltage level potential, measure the signal $v_{k+1}$; compare $V_k$ and $v_{k+1}$, if $v_k$ is greater than $v_{k+1}$, point P is near to row k, if $v_k$ is less than $v_{k-1}$, point P is near to row k+1;

(f) applying AC signal to common rows, all the rows at a specific DC voltage, measure the signal $v_1$; applying AC signal to all rows, with the common rows at a specific DC voltage, measure the signal $v_2$; comparing $v_2$ to $v_1$, if $v_2/v_1$ is greater than 1, point P is closer to row k; if $v_2/v_1$ is less than 1, point P is closer to common row;

(g) repeating step (a) to (f) for the column.

16. The position detection device as recited in claim 15, wherein said specific voltage level and specific DC voltage are ground potential.

17. The method as recited in claim 15, wherein said specific voltage level is a DC voltage.

18. The method as recited in claim 15, wherein said specific voltage level is an AC voltage.

19. The method as recited in claim 15, wherein the space between row k and common row is divided into n divisions, by storing the experiment $v_2/v_1$ ratio corresponding to each space n for different dielectric constant material and different thickness of material over the conducting wires, the position can be determined by comparing the detecting $v_2/v_1$ ratio to the stored value.

* * * * *